(12) United States Patent
Byttebier (10) Patent No.: US 10,253,703 B2
(45) Date of Patent: Apr. 9, 2019

(54) METHOD AND APPARATUS FOR CONTROLLING ENGINE SPEED OF A WORK MACHINE

(71) Applicant: CNH Industrial America LLC, New Holland, PA (US)

(72) Inventor: Ward M. R. Byttebier, Zwevegem (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/745,434

(22) PCT Filed: Jul. 15, 2016

(86) PCT No.: PCT/EP2016/066980
§ 371 (c)(1),
(2) Date: Jan. 16, 2018

(87) PCT Pub. No.: WO2017/009470
PCT Pub. Date: Jan. 19, 2017

(65) Prior Publication Data
US 2018/0209357 A1 Jul. 26, 2018

(30) Foreign Application Priority Data

Jul. 16, 2015 (BE) .................................. 2015/5459

(51) Int. Cl.
*F02D 31/00* (2006.01)
*A01D 41/127* (2006.01)
(Continued)

(52) U.S. Cl.
CPC ......... *F02D 31/001* (2013.01); *A01D 41/127* (2013.01); *B60W 30/188* (2013.01);
(Continued)

(58) Field of Classification Search
None
See application file for complete search history.

(56) References Cited

U.S. PATENT DOCUMENTS 8,061,112 B2 11/2011 Hugenroth
8,068,970 B2 11/2011 Hugenroth et al.
(Continued)

FOREIGN PATENT DOCUMENTS

DE 102008036378 A1 2/2010
DE 102010028071 A1 10/2011
(Continued)

*Primary Examiner* — Thomas G Black
*Assistant Examiner* — Demetra R Smith-Stewart
(74) *Attorney, Agent, or Firm* — Peter K. Zacharias (57) ABSTRACT

The invention is related to a method for controlling the rotational speed of an engine operating as the power source of a work machine, preferably an agricultural harvester, wherein a change in the load required from the engine during operation of the machine results in the controlled change of the engine speed towards a target value defined by a control curve, wherein the controlled change takes place according to one of a plurality of active control characteristics, depending on the degree of change in the engine speed detected as a direct consequence of the load change. A faster or slower speed change may for example be selected, and/or the target value may be continuously updated. According to a further embodiment, the control curve is referenced to the crop load, being the part of the load related to crop processing. The invention is related also to a machine equipped with a control mechanism configured to implement the method of the invention.

18 Claims, 3 Drawing Sheets

(51) Int. Cl.
*B60W 30/188* (2012.01)
*F02B 61/00* (2006.01)

(52) U.S. Cl.
CPC ............... *B60W 2300/158* (2013.01); *B60W 2510/0638* (2013.01); *B60W 2510/0657* (2013.01); *B60W 2710/0644* (2013.01); *B60W 2710/0661* (2013.01); *F02B 61/00* (2013.01); *F02D 2200/101* (2013.01); *F02D 2200/1002* (2013.01)

(56) References Cited

U.S. PATENT DOCUMENTS

| | | | |
|---|---|---|---|
| 8,230,667 B2 | 7/2012 | Finkler et al. | |
| 8,775,032 B2 | 7/2014 | Wolfcarius et al. | |
| 2003/0075145 A1* | 4/2003 | Sheidler | F02D 31/007 123/396 |
| 2012/0304635 A1* | 12/2012 | Ooi | E02F 9/2246 60/431 |
| 2015/0315766 A1* | 11/2015 | Take | F02D 41/0205 701/22 |
| 2017/0113697 A1* | 4/2017 | Faivre | B60W 30/18172 |

FOREIGN PATENT DOCUMENTS

| | | |
|---|---|---|
| EP | 1308342 A2 | 5/2003 |
| WO | 2010062242 A1 | 6/2010 |
| WO | 2012127221 A2 | 9/2012 |
| WO | 2013147675 A1 | 10/2013 |

\* cited by examiner

METHOD AND APPARATUS FOR CONTROLLING ENGINE SPEED OF A WORK MACHINE

FIELD OF THE INVENTION

The present invention is related to work machines, primarily to agricultural work vehicles such as combine harvesters or forage harvesters and in particular to the control of the engine speed of such machines.

STATE OF THE ART

Combine or forage harvesters are driven by a fuel engine, which is the power source for the crop-processing components, such as the header, threshing rotors, cleaning mechanism, chopping mechanism, as well as for the machine's propulsion, with a variable drive such as a hydrostatic drive being used for controlling the travel speed of the machine. Several methods and control systems have been described for controlling the engine rotational speed during a harvesting run. The traditional approach is to run the engine at a high fixed speed in order to ensure homogeneous processing of the crops and to control fuel injection in order to absorb load fluctuations without the crop flow through the machine becoming jammed. This way of operating does, however, leads to a high consumption of fuel and to the generation of high noise levels.

Above a given engine load, most harvesters operate most effectively at an engine speed that is below the traditionally applied maximum speed. This has been acknowledged in existing control systems, for example the system described in document US-A-2011/0203243, related to a harvester wherein the target engine speed is maintained at a constant maximum for engine loads up to a first level, decreases linearly as a function of the load when the load increases up to a second load level, and is maintained constant at a speed lower than the maximum when the load further increases above the second level. When the load reaches a maximum defined by the engine characteristic, the speed is defined by said characteristic. This approach allows a more energy-efficient operation of the machine. However, when the required engine load increases or decreases very fast, for example when the machine needs to process a large amount of crop entering the header in a short time, or passes through an area with no or very few crop, these types of systems are at a risk of instability. If the sudden load change takes place within a constant engine RPM regime, the control may be unable to maintain constant RPM in a sufficiently stable way. If the load increases very fast from a load delivered at high engine speed to a load that requires a change to the low engine speed, e.g., due to a sudden rise in crop intake, the control may tend to decrease engine speed too quickly, leading to problems in the processing of the instantaneous rise in crop intake. Finally, the load level at which the engine speed changes from high to low speed is based on a measurement of the total engine load. This may lead to premature activation of the speed control in circumstances where a high engine load is not due to increased crop intake, but to other circumstances, for example to increased steepness of the terrain.

SUMMARY OF THE INVENTION

The invention is related to a method and to a machine as described in the appended claims. The invention is related to a method for controlling the rotational speed of an engine operating as the power source of a work machine, preferably an agricultural harvester, wherein a change in the load required from the engine during operation of the machine results in the controlled change of the engine speed towards a target value defined by a control curve, wherein the controlled change takes place according to one of a plurality of active control characteristics, depending on the degree of change in the engine speed detected as a direct consequence of the load change. A faster or slower speed change may for example be selected, and/or the target value may be continuously updated. According to another embodiment, the control curve is referenced to the crop load, being the part of the load related to crop processing. The invention is related also to a machine equipped with a control mechanism configured to implement the method of the invention.

The invention is thus more in particular related to a method for controlling the rotational speed of an engine that operates as the power source of a work machine, comprising the steps of:
  obtaining a measured value representative of the engine load,
  obtaining a measured value of the engine rotational speed,
  deriving from a pre-defined control curve, a target value for the engine speed as a function of the measured engine load value or a portion thereof,
  if the measured speed differs from the target value, changing the engine speed towards the target value, according to an active control characteristic, wherein the active control characteristic is selected from a plurality of active control characteristics, based on the change detected in the measured engine speed as a consequence of a change in the engine load.

In the above method, an 'active control characteristic' is defined as the following set of control parameters: a value for the target speed and a rate of change of the speed towards said target speed, wherein the rate of change may be constant or otherwise.

DETAILED DESCRIPTION OF PREFERRED EMBODIMENTS OF THE INVENTION

Preferred embodiments will now be described with reference to the drawings. The detailed description is not limiting the scope of the invention, which is defined only by the appended claims. The invention is related to a method for controlling the engine speed of a work machine, with the main application being agricultural work vehicles, in particular combine or forage harvesters. The detailed description uses the latter as preferred examples but the skilled person will understand that other types of work machines can be operated according to the method of the invention.

Figure 1:
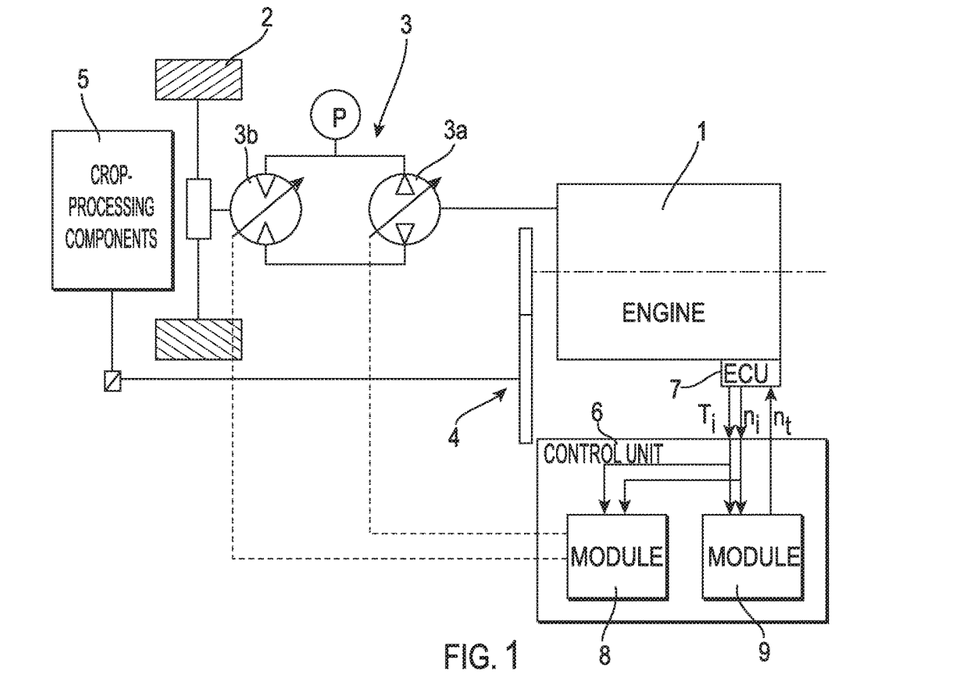
FIG. 1 is a drive scheme illustrating the main components of an agricultural harvesting machine that play a part in the method of the invention.

FIG. 1 is a schematic representation of a number of components of a harvesting machine according to the invention, which may be a combine harvester or a forage harvester. An internal combustion engine 1 drives the wheels 2 of the machine through a hydrostatic drive 3, comprising a combination of a hydrostatic pump 3a and motor 3b. The crop-processing components 5 such as the cutting drums, the feed rollers, the blower, etc. are driven by a mechanical drive 4 consisting of, for example, gears and/or belt drives. A control unit 6 is also shown schematically, and will hereafter be referred to as the VCU (Vehicle Control Unit). The VCU is distinct from the ECU 7, the Engine Control Unit. The ECU is a control module commonly present on contemporary engines, which provides a number of signals during engine operation, indicative of parameters such as fuel consumption, engine rotational speed ($n_i$) and engine load. The engine load can be expressed as the instantaneous torque $T_i$ delivered by the engine's drive axis, as measured by suitably mounted sensors or as calculated on the basis of a measurement of the delivered engine power and speed. The VCU 6 is preferably embodied as a programmed or programmable electronic module linked to the ECU 7 and configured to receive said signals related to the engine load and speed, and to send control signals to the ECU 7 in order to control the engine speed according to a control algorithm programmed in the VCU 6.

A module 9 of the VCU 6 calculates the target value $n_t$ of the engine rotation speed and transmits said target value $n_t$ along with the necessary control data to the ECU 7 in order to command the engine 1 to run at the target speed value $n_t$. Another module 8 of VCU 6 controls the travel speed of the harvester through control of the elements of the hydrostatic drive 3. The present invention is related to a method for controlling the rotational speed of the engine of the machine, as well as to an agricultural machine wherein the VCU 6 is configured or programmed to control the engine according to said method.

Figure 2:
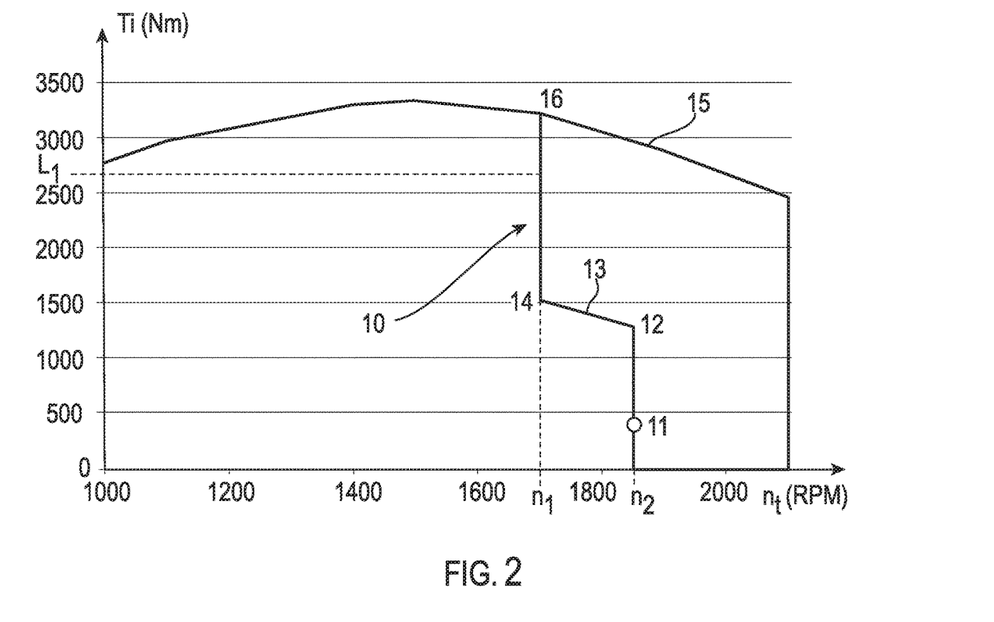
FIG. 2 is a graph illustrating a control regime for controlling the engine speed, to which the method of the invention can be applied.

The method according to various embodiments of the invention is applicable to a harvester, equipped with a VCU 6 which controls the engine speed in accordance with a control curve 10 that shows the relationship between the measured engine load $T_i$ and the target engine speed $n_t$, as illustrated in FIG. 2. The curve 10 is to be regarded as an engine control regime that can be selected by the machine operator, and that may be distinct from other operating regimes, such as a regime for driving on the road or on headland. The regime defined by curve 10 is selected at the start of a harvesting run. When the machine has not yet entered the crops, the measured engine load is low, for example at point 11, and the engine speed is set at a maximum level $n_2$, to ensure sufficient engine power at the start of the actual harvesting. When harvesting begins, the load increases due to the crop intake and processing and/or due to the operator increasing the velocity of the harvester. The engine rotation speed is maintained constant up to a predefined first level 12 of the measured engine load. For loads above said first level 12, the VCU 6 changes the target speed $n_t$ to lower values, according to a pre-defined so-called torque backup curve 13, preferably a linear function, up to a second load level 14. For even higher loads, the speed is maintained at a constant level $n_1$, lower than the initial constant level $n_2$. When the load reaches the maximum available load 16 defined by the engine characteristic 15, the speed is further controlled according to this characteristic. When the load decreases, the target speed is set according to the same curve 10.

In itself, this type of control curve 10 is known from US-A-2011/0203243 as explained above. The method of the invention however comprises a number of improvements. According to one embodiment, the manner in which the engine speed is actively changed by the VCU 6 towards a target value, as a consequence of a change in the engine load is dependent on the manner in which the engine reacts to a change in the measured engine load $T_i$. As shown in FIG. 1, the control algorithm for controlling the engine speed uses the measured engine speed $n_i$ as one of the input values. A change in the measured engine speed detected as a direct consequence of a load change may therefore be used as a parameter for adapting the algorithm to changing circumstances.

The basic control algorithm can be summarized as follows: at fixed sampling times (for example every few milliseconds, e.g. every 10 ms), the VCU 6 receives signals that are representative of the measured engine load $T_i$ and of the measured engine speed $n_i$. Based on the curve 10, the VCU 6 either maintains the speed at the value $n_i$, if the measured values $T_i$ and $n_i$ correspond to a point on the curve 10, or, if $T_i$ and/or $n_i$ do not correspond to a point on the curve 10, the target speed is changed to the value that corresponds to $T_i$ on the curve 10, by sending the target value to the engine's ECU 7, along with control data that determine inter alia how fast the new speed value is to be reached. After a number of samples, this will result in the engine running at the desired target speed. A change in the load (accelerating the vehicle, increase of crop intake) generally causes a change in the engine speed that is subsequently detected and corrected by the above algorithm so that the speed is maintained at values according to the curve 10. In other words, a change in the load forces a change in the engine speed that is subsequently corrected. Sometimes this change in the engine speed is zero or minimal, if the load change is small, or if the engine is running at a high speed at which it is capable of delivering high loads. Sometimes the speed change is higher, for example when the harvester encounters an obstacle that causes a sudden load increase that forces the engine to slow down. The VCU's task is then to bring the speed back to its original value or to another target value defined by the curve 10 for example. The manner in which the speed is actively steered from one value to another (for example the rate of change) depends on the control hardware and/or software implemented in the VCU 6. According to the invention, the VCU is configured to adopt specific control mechanisms depending on the measured changes in the engine speed $n_i$ as a direct consequence of changes in the load $T_i$.

Figure 3A:
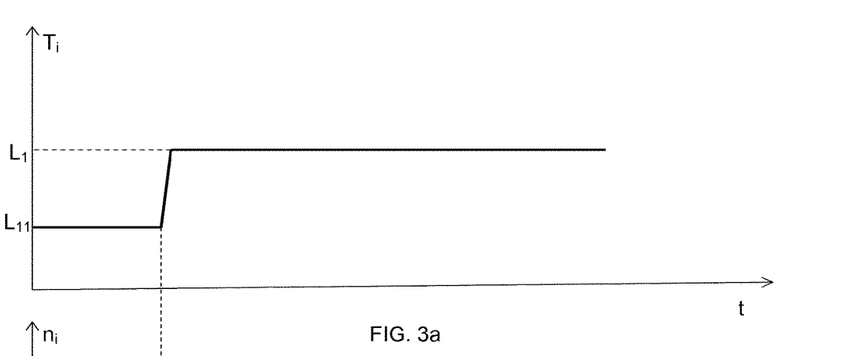
FIGS. 3a and 3b show the change, as a function of time, of the measured engine load and of the measured engine speed when the speed control is effected according to a specific active control characteristic.

A first embodiment is most useful in a situation where the load rises in a short time from the low load area between zero load and point 12, to a higher load above point 12 or above point 14 and subsequently stays at or around this high level. This may happen when the machine enters a field, and the measured load quickly rises from a level at, for example, point 11 on the curve 10 to a level $L_1$ situated above point 14. FIG. 3a illustrates the load as a function of time, the machine entering the field at moment $t_e$. The load rises quasi-instantaneously to $L_1$ and remains at or around this high level. As $L_1$ is higher than the threshold level 12 and higher than the upper level 14 of the torque backup curve 13, the VCU 6 will want to bring the speed down to $n_1$. If the load increase is more gradual, the basic algorithm can work and the speed is gradually brought down to $n_1$ according the torque backup curve 13. However, if the load increase is too fast for the control algorithm to react, the resulting measured values of $n_t$ are dictated by the engine's reaction to the sudden load increase.

Figure 3B:
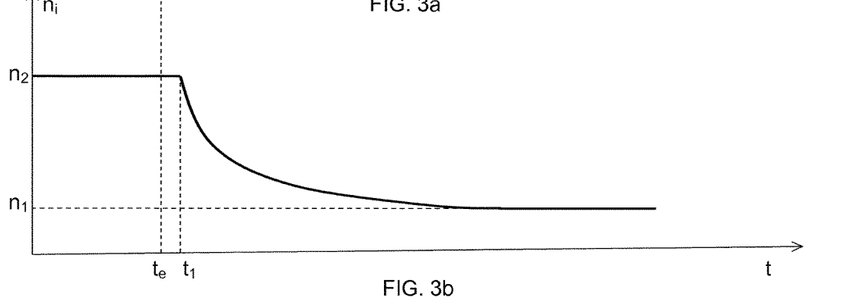

If the engine speed $n_t$ is not or very minimally affected by the sudden load increase, as illustrated in FIG. 3b, this means that the load increase does not force the engine speed down, i.e. the engine is capable of delivering the required high load $L_1$ without slowing down (or the speed drop is very small and virtually non-detectable). If this is the case, the engine speed is subsequently, e.g. at moment $t_1$, brought down by the VCU 6 in an actively controlled manner, for example by decreasing the requested speed exponentially as illustrated in FIG. 3b. This may be programmed into the VCU 6, for example by applying a rate of change of 30 RPM/min at the start and gradually decreasing the rate of change to 10 RPM/min or less as the speed approaches the target value $n_1$. This exponential speed decrease is defined in the context of the present description as one element of the 'active control characteristic' applied by the VCU 6. The active control characteristic is defined by two elements: the target speed and a pre-scribed rate of change of the speed by which the requested speed changes towards said target. The rate of change can be exponential as described above, or it may be linear or according to any other pre-scribed time-dependent rate. In the state of the art systems, the active control characteristic is however the same regardless of how large the load change is or how quickly the load change is taking place, circumstances which may have an immediate impact on the measured engine speed. In the method of the invention, a different active control characteristic is selected depending precisely on said impact of the load change on the measured engine speed.

Figure 4A:
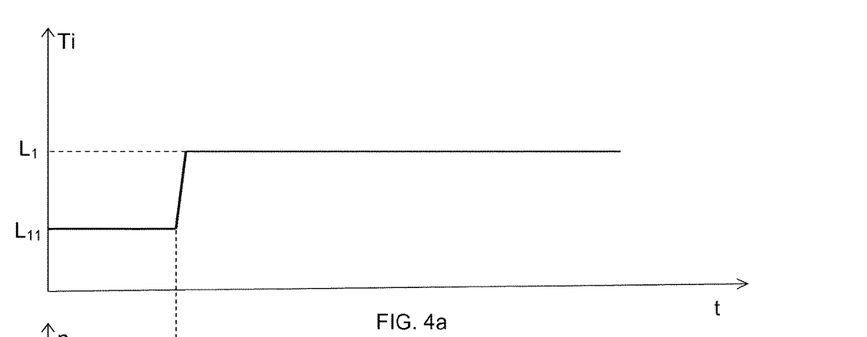
FIGS. 4a and 4b show the change, as a function of time, of the measured engine load, and of the measured engine speed when the speed control is effected according to an active control characteristic, different from the characteristic of FIG. 3b.
Figure 4B:
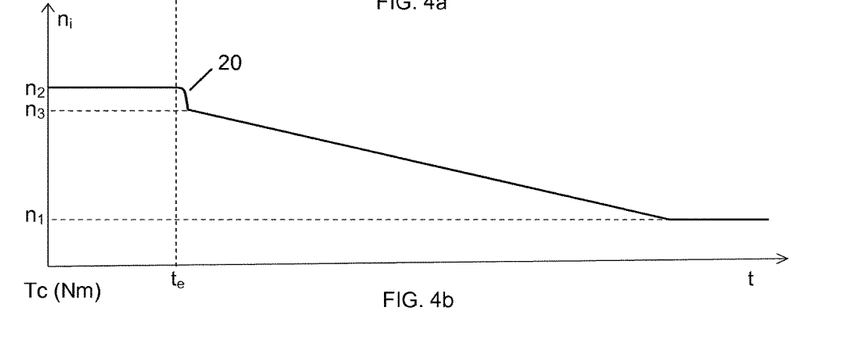

In the first embodiment, returning to the 2-speed regime of curve 10 in FIG. 2, a different active control characteristic is applied if the measured speed value $n_3$, detected as a reaction to the load increase from point 11 to L1, is significantly below $n_2$. This is illustrated in FIGS. 4a and 4b. The drop in the speed from $n_2$ to $n_3$ indicates that the load increase has forced the engine to slow down in order to deliver the required load. If the above-described exponential speed change would be subsequently applied by the VCU, the engine is in danger of slowing down too quickly which may lead to instability and blocking. According to the invention, the rate of change of the speed is decreased in this case, for example by changing from an exponential decrease to a linear decrease at a constant rate of 10 RPM/min, as illustrated in FIG. 4b. The curve illustrates the speed drop 20 as a result of the sudden load increase, followed by the linear speed decrease down to $n_1$. The slower speed decrease ensures that $n_1$ is reached without instability of the engine. The time required for reaching $n_1$ is longer compared to the case of FIG. 3. The linear speed decrease that is actively controlled by the VCU 6, is thus part of a 'active control characteristic' different over the one of FIG. 3a/3b. Instead of a linear decrease, an exponential decrease with a lower time constant could be applied.

The selection of an active control characteristic is thus made as a function of the degree of change in the measured engine speed $n_t$ as a direct consequence of a load change. The precise manner in which a speed change forced by a load change is detected and acted upon may depend on the details of the control hardware and software implemented in the VCU (sampling time, reaction time of the controller, etc.). For example, the VCU may be programmed to detect changes in the measured speed $n_t$ higher than a predefined minimum and taking place within a number of sampling times smaller than a pre-defined minimum. If such changes are detected together with a load change that requires a change in speed regime according to curve 10 (e.g. from $n_2$ to $n_1$), the appropriate active control characteristic may be selected, for example a linear decrease in speed, as explained with respect to respect FIGS. 3 and 4.

The first embodiment as described above with reference to FIGS. 2 to 4 is applicable to any change in the load that also results in a change of the target speed, including for example a change from a load level between the levels at points 12 and 14, e.g. on the torque backup portion of the control curve 10, to another level on the torque backup curve, or to a load that requires a change to $n_1$ or $n_2$. The first embodiment is applicable to a load increase as described above as well as to a drop in the load, for example from operation at high load and low speed (above point 14), to operation at lower load and higher speed (on the torque backup curve 13 or below point 12). This may occur when the harvester encounters an area without crops or with instantaneously decreased crop density. In an analogue way as described above, the engine speed may increase as a consequence of the sudden load change and before the control algorithm is able to increase the speed in a controlled way. In cases of a very fast instantaneous speed increase, it is advantageous to control the further speed increase of the engine towards the new target value in such a way that this increase takes place over a longer period of time, in order to avoid instability. For example when the normal control algorithm increases engine speed exponentially, the increase may be controlled according to a slower linear curve, in cases where the increase in the measured speed detected as a direct consequence of the drop in the load is higher than a given limit.

A second embodiment is applicable to a situation taking place when the engine is running at either speed $n_1$ or $n_2$. A sudden rise in the load $T_t$ takes place, but the load remains within a constant speed regime, i.e. between zero load and point 12 on the curve 10 or between point 14 and maximum load at point 16, i.e. the target speed of the engine does not change as a consequence of the load change. Nevertheless, the sudden rise in the load may be registered by the VCU as a significant drop in the measured speed $n_t$. Such a speed change may happen for example when the harvester takes in a dense bunch of crops or debris in the field, which instantaneously increases the engine load. If the load increase exceeds the instantaneous capability of the engine to deliver the required load, the engine speed will be forced down, at which point the control algorithm kicks in, to bring the speed back towards the set value. According to the second embodiment of the invention, this involves the following change to the basic algorithm. If the engine speed drops by a value of D below the set value $n_t$ (which may be $n_1$ or $n_2$), a new target value of $n_t+D$ is instantaneously adopted. This causes the speed to rise towards $n_t+D$ instead of to $n_t$, resulting in a quicker rise of the speed. At the next sampling time, the speed is measured to be a value D' (lower than D) below $n_t$, at which point the new target value is set at $n_t+D'$. This continues until the target value reaches $n_t$. If a small overshoot takes place, the same dynamic update of the target value takes place but in the inverse direction. If $n_t$ equals $n_t+d$, the new target value is $n_t-d$, etc. In view of the definition of the 'active control algorithm' given above, the re-setting of the target value is equal to the selection of another active control algorithm as a reaction to a change in the measured engine speed. The change towards the new target value can be linear or exponential or other. It is the change of the target value that defines the selection of a new active control characteristic, and which brings the second embodiment within the same scope as the first embodiment, as compared to the prior art. The value by which the target speed is re-set need not be equal to the exact difference D between the measured speed and the constant speed at which the engine was running. What counts is that the target speed is re-set in the opposite direction than the speed change. However re-setting the target to $n_t$ plus or minus D is the preferred option.

The above-described dynamic update of the target value according to the second embodiment results in a faster stabilization of the engine speed when the machine encounters a sudden increase or decrease of the required load while working in a constant speed regime. According to a preferred embodiment, this control method works without a so-called deadband, i.e. without a required minimum deviation from the target speed before the above-described control method according to the second embodiment is applied.

Figure 5:
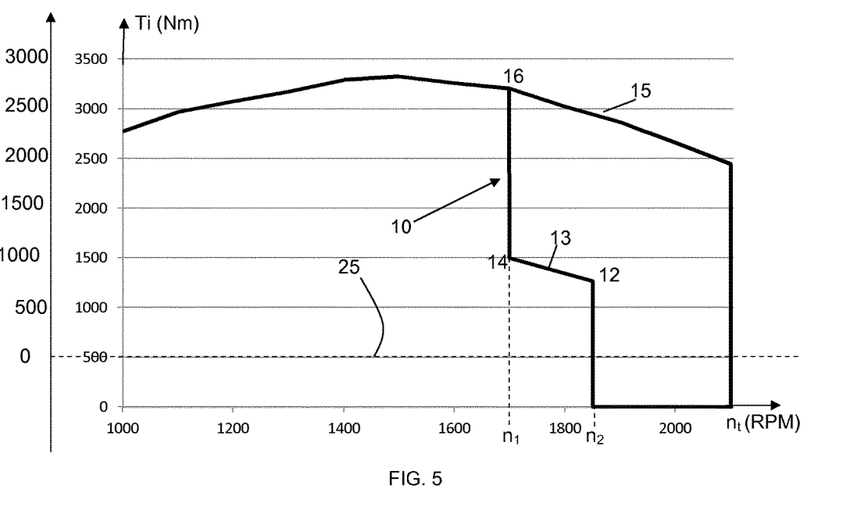
FIG. 5 illustrates how the crop load can be used as the reference for determining the target engine speed.

Another aspect of the present invention is related to the load measurement $T_i$. According to an embodiment of the invention, the crop load $T_c$ is used an input value for the VCU 6 in addition to the total engine load $T_i$. The crop load is defined as the portion of the total engine load that is applied to crop processing. It is equal to the total load minus the portion of the load that is directly related to driving the harvester, referred to as the 'traction load'. The traction load can be derived from measurements on the hydrostatic drive 3, according to: traction load=traction pressure (bar)*hydro pump displacement (cc), with the traction pressure measured by a sensor P (FIG. 1), and the displacement of the hydro pump measured as a parameter of the hydrostatic pump 3a. According to the invention, curve 10 is referenced with respect to a zero crop load level 25 as illustrated in FIG. 5. The point 12 at which the speed regime changes from high to low is defined as a pre-defined crop load level as opposed to a pre-defined total engine load level in prior art systems. This means that at all times the speed control is applied on the basis of the energy required for crop processing. What is avoided hereby is a situation where the VCU 6 pushes the engine down to a lower speed because the total engine load rises for reasons not related to crop processing, for example because the harvester is driving uphill or on uneven terrain. The zero crop load level is dependent on the properties (inclination, soil, humidity, . . . ) of a particular field and on the status of a number of the harvester's parameters, e.g. height setting of the header, knife speed, thresher rotor speed, etc. Therefore, according to the invention, the zero crop load level is measured before a harvesting run by driving the harvester on a headland portion and measuring the traction load. This value is then defined as the zero crop load level and the curve 10 is defined with respect to said level during the subsequent harvesting run. If the operator changes any of the relevant harvester parameters during the run, the zero crop load value needs to be measured again before starting on the next run.

Figure 6:
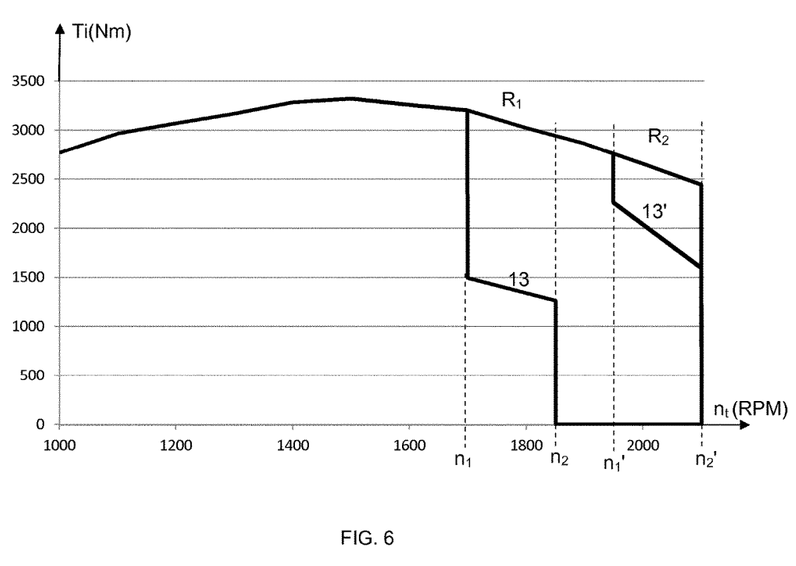
FIG. 6 illustrates a control mechanism having two distinct speed regimes.

According to an embodiment of the invention, the harvester is configured to work under a plurality of control regimes, each regime being defined by a specific speed range $n_1$-$n_2$ and a specific torque backup curve 13. This is illustrated in FIG. 6 where two distinct speed regimes $R_1$ and $R_2$ are depicted. $R_1$ operates between speeds $n_1$ and $n_2$ in the manner described above. $R_2$ operates between speeds $n_1'$ and $n_2'$, higher than $n_1$ and $n_2$. The operator can select one or the other of these regimes depending on circumstances (difficult terrain, dense crops, etc.). According to the preferred embodiment shown in FIG. 6, the torque backup curve 13' of speed regime $R_2$ has a steeper slope than the torque backup curve 13 of speed regime $R_1$. This means that under the high speed regime $R_2$, the speed drop is lower than under speed regime $R_1$, for the same load increase. In other words, the speed reduction is less drastic, which is favorable when working under the higher loads encountered under this regime $R_2$: the higher the speed, the better the engine is capable of reacting to sudden load changes without becoming unstable.

The invention is related to the control methods as described above and to a harvester or other work machine equipped with a VCU 6 configured to apply these methods. To summarize, the following methods have been described:
method for changing the speed from one speed to a higher or lower speed in a control regime working between a high and low speed level, with a torque backup curve in between the two, wherein the active control characteristic is selected as a function of the speed change detected as a direct consequence of a load increase;
method for maintaining a constant speed by dynamically updating the speed target value;
method for controlling the engine speed on the basis of a measurement of the crop load;
method for operating the machine having the possibility of selecting between a plurality of speed regimes R1/R2.

These methods may be applied simultaneously or separately on a given machine. The method for dynamically changing the target value of the speed is applicable to any work machine wherein a constant speed regime is applied, so also for example to harvesters that work with the traditional control of working at constant maximum speed, and thus without a torque backup curve 13.

The invention claimed is:

1. A method for controlling the rotational speed of an engine that operates as a power source of a work machine, the method comprising the steps of:
obtaining a measured value representative of a load on the engine;
obtaining a measured value of a rotational speed of the engine;
deriving, from a pre-defined control curve, a target value for the engine speed as a function of the measured engine load value or a portion thereof; and
if the measured speed differs from the target value, changing the engine speed towards the target value, according to an active control characteristic, the active control characteristic comprising a rate at which the measured engine steed is adjusted toward the target value,
wherein the active control characteristic is selected from a plurality of active control characteristics, based on a change detected in the measured engine speed as a consequence of a change in the engine load.

2. The method according to claim 1, wherein:
the pre-defined control curve comprises a first portion where the target speed is constant at a first value, a second portion where the target speed is constant at a second value higher than the first, and a third portion where the target speed is an increasing function of the measured load, increasing from the first to the second value,
said change in the load is a change that triggers a target speed change defined by the control curve, thereby defining a new target value, and an active control characteristic is selected that is configured to actively bring the engine speed to the new target value in a longer or shorter time period, respectively depending on whether said change detected in the measured engine speed is higher or lower than a given level.

3. The method according to claim 2, wherein a first type of active control characteristic is selected when the change detected in the measured engine speed is lower than a predefined level, and wherein a second type of active control characteristic is selected when the change detected in the measured engine speed is above said level.

4. The method according to claim 3, wherein the first active control characteristic imposes an exponential speed change towards the new target value, and wherein the second active control characteristic imposes a linear speed change towards the new target value.

5. The method according to claim 1, wherein:
the pre-defined control curve comprises at least one portion where the target speed is constant for a range of load values;
said change in the load is a change from a first value within said range to a second value within said range; and
the active control characteristic is defined by re-setting the speed target value to a value that is higher or lower than the constant target speed when the measured speed is lower or higher respectively compared to the constant target speed.

6. The method according to claim 5, wherein the re-set target speed is higher or lower than the constant target speed by an amount that is equal to the amount by which the measured speed is lower or higher respectively compared to the constant target speed.

7. The method according to claim 1, wherein said work machine is an agricultural harvesting machine, said engine driving the propulsion of the machine as well as the harvesting and processing of crops, the method further comprising the step of obtaining or determining the portion of the measured engine load that is applied to crop processing, and wherein the pre-defined control curve defines a relation between said portion applied to crop processing and the target speed.

8. The method according to claim 7, further comprising the step of determining the total engine load level that corresponds to zero crop processing load.

9. A method for controlling the rotational speed of an engine that operates as the power source of a work machine, the method comprising the steps of:
obtaining a measured value representative of a load of the engine;
obtaining a measured value of a rotational speed of the engine;
deriving from a pre-defined control curve, a target value for the engine speed as a function of the measured engine load value or a portion thereof,
if the measured speed differs from the target value, changing the engine speed towards the target value, according to an active control characteristic, wherein said work machine is an agricultural harvesting vehicle, said engine driving the propulsion of the machine as well as the harvesting and processing of crops, the method further comprising the step of obtaining or determining the portion of the measured engine load that is applied to crop processing, and wherein the pre-defined control curve defines a relation between said portion applied to crop processing and the target speed.

10. A method for controlling the rotational speed of an engine that operates as the power source of a work machine, the method comprising the steps of:
obtaining a measured value representative of a load of the engine;
obtaining a measured value of a rotational speed of the engine;
deriving from a pre-defined control curve, a target value for the engine speed as a function of the measured engine load value or a portion thereof;
if the measured speed differs from the target value, changing the engine speed towards the target value, according to an active control characteristic wherein:
the pre-defined control curve comprises a first portion where the target speed is constant at a first value, a second portion where the target speed is constant at a second value higher than the first, and a third portion where the target speed is an increasing function of the measured load, increasing from the first to the second value, and
the operator of the machine can select from at least two of said pre-defined control curves, the second control curve operating between first and second speeds that are higher than the first and second speed of the first control curve, and wherein according to the second control curve, the target speed decreases less rapidly in the third portion of the curve than according to the first control curve.

11. A work machine comprising an engine and a control unit configured to control the rotational speed of the engine according to the method of claim 1.

12. An agricultural harvesting vehicle comprising an engine and a control unit configured to control the rotational speed of the engine according to the method of claim 1.

13. A method for controlling the rotational speed of an engine that operates as a power source of a work machine, the method comprising:
obtaining a measured value representative of a load on the engine;
obtaining a measured value of a rotational speed of the engine;
deriving, from a pre-defined control curve, a target value for the engine speed as a function of the measured engine load value or a portion thereof, the pre-defined control curve comprising a first portion where the target speed is constant at a first value, a second portion where the target speed is constant at a second value higher than the first value, and a third portion where the target speed is an increasing function of the measured load, increasing from the first to the second value; and
if the measured speed differs from the target value, changing the engine speed towards the target value according to an active control characteristic,
wherein the active control characteristic is selected from a plurality of active control characteristics based on a change detected in the measured engine speed as a consequence of a change in the engine load, the change in the load being a change that triggers a target speed change defined by the control curve such that a new target value is defined, the selected active control characteristic configured to actively bring the engine speed to the new target value in a longer or shorter time period, respectively, depending on whether the change detected in the measured engine speed is higher or lower than a given level, a first type of active control characteristic being selected when the change detected in the measured engine speed is lower than a predefined level and a second type of active control characteristic being selected when the change detected in the measured engine speed is above the predefined level.

14. The method according to claim 13, wherein the first active control characteristic imposes an exponential speed change towards the new target value, and wherein the second active control characteristic imposes a linear speed change towards the new target value.

15. The method according to claim 13, wherein:
the pre-defined control curve comprises at least one portion where the target speed is constant for a range of load values;
said change in the load is a change from a first value within said range to a second value within said range; and
the active control characteristic is defined by re-setting the speed target value to a value that is higher or lower than the constant target speed when the measured speed is lower or higher respectively compared to the constant target speed.

16. The method according to claim 15, wherein the re-set target speed is higher or lower than the constant target speed by an amount that is equal to the amount by which the measured speed is lower or higher respectively compared to the constant target speed.

17. The method according to claim 13, wherein said work machine is an agricultural harvesting machine, said engine driving the propulsion of the machine as well as the harvesting and processing of crops, the method further comprising the step of obtaining or determining the portion of the measured engine load that is applied to crop processing, and wherein the pre-defined control curve defines a relation between said portion applied to crop processing and the target speed.

18. The method according to claim 17, further comprising the step of determining the total engine load level that corresponds to zero crop processing load.

* * * * *